US009647280B2

(12) United States Patent
Matsumoto et al.

(10) Patent No.: US 9,647,280 B2
(45) Date of Patent: May 9, 2017

(54) FUEL CELL VEHICLE

(75) Inventors: Shiro Matsumoto, Shizuoka-ken (JP); Naoki Ozawa, Shizuoka-ken (JP); Toru Eguchi, Shizuoka-ken (JP); Damian Patrick Davies, Nottinghamshire (GB)

(73) Assignee: Suzuki Motor Corporation, Shizuoka-ken (JP)

( * ) Notice: Subject to any disclaimer, the term of this patent is extended or adjusted under 35 U.S.C. 154(b) by 670 days.

(21) Appl. No.: 14/111,970

(22) PCT Filed: Feb. 29, 2012

(86) PCT No.: PCT/JP2012/055023
§ 371 (c)(1),
(2), (4) Date: Oct. 15, 2013

(87) PCT Pub. No.: WO2012/147406
PCT Pub. Date: Nov. 1, 2012

(65) Prior Publication Data
US 2014/0045090 A1    Feb. 13, 2014

(30) Foreign Application Priority Data

Apr. 28, 2011  (JP) ................................ 2011-100934

(51) Int. Cl.
*H01M 8/04082* (2016.01)
*B60K 1/04* (2006.01)
(Continued)

(52) U.S. Cl.
CPC .......... *H01M 8/04201* (2013.01); *B60K 1/04* (2013.01); *B60L 11/1892* (2013.01);
(Continued)

(58) Field of Classification Search
CPC ................................................ H01M 8/04201
See application file for complete search history.

(56) References Cited

FOREIGN PATENT DOCUMENTS

| JP | 2001-313061 A | 11/2001 |
| JP | 2001313061 A | * 11/2001 |

(Continued)

OTHER PUBLICATIONS

JP 2008251330 A with translation from JPO.*
(Continued)

*Primary Examiner* — Barbara Gilliam
*Assistant Examiner* — Nathanael Zemui
(74) *Attorney, Agent, or Firm* — Alston & Bird LLP

(57) ABSTRACT

An object is to supply a sufficient amount of air to a fuel cell stack in a fuel cell vehicle when the fuel cell stack is mounted below a floor, the fuel cell stack configured to draw in air through an intake duct and discharge air to the exterior through an exhaust duct. An air introduction surface (26) faces upward or downward in a vehicle upper and lower direction, an intake passage portion (30) of the intake duct (28) extends along the air introduction surface (26) and vertical walls (31, 32) of left and right end portions of the fuel cell stack (11) while a pair of air introduction ports (33, 34) opens in left and right end portions of the intake passage portion (30), and an exhaust passage portion (39) of the exhaust duct (29) extends along an air discharge surface (27) and vertical walls (40, 41) of front and rear end portions of the fuel cell stack (11) while a pair of air discharge ports (42, 43) opens in front and rear end portions of the exhaust passage portion (39).

6 Claims, 4 Drawing Sheets

(51) Int. Cl.
*H01M 8/2465* (2016.01)
*H01M 8/04089* (2016.01)
*B60L 11/18* (2006.01)
*B60K 15/03* (2006.01)
*B60K 15/07* (2006.01)
*B60K 11/06* (2006.01)
*B60K 15/063* (2006.01)

(52) U.S. Cl.
CPC ..... *H01M 8/04089* (2013.01); *H01M 8/2465* (2013.01); *B60K 11/06* (2013.01); *B60K 15/07* (2013.01); *B60K 2001/0438* (2013.01); *B60K 2015/03315* (2013.01); *B60K 2015/0633* (2013.01); *B60L 2200/34* (2013.01); *H01M 2250/20* (2013.01); *Y02T 90/32* (2013.01); *Y02T 90/34* (2013.01)

(56) References Cited

FOREIGN PATENT DOCUMENTS

| | | | |
|---|---|---|---|
| JP | 2004-042828 A | | 2/2004 |
| JP | 2004042828 A | * | 2/2004 |
| JP | 2008-251330 A | | 10/2008 |
| JP | 2008251330 A | * | 10/2008 |
| JP | 2010-126015 A | | 6/2010 |
| JP | 2010-274675 A | | 12/2010 |

OTHER PUBLICATIONS

JP 2001313061 A with translation from JPO.*
JP 2004042828 A with translation from JPO.*
International Search Report and Written Opinion of the International Searching Authority dated May 22, 2012 for corresponding Application No. PCT/JP2012/055023.

* cited by examiner

FUEL CELL VEHICLE

CROSS-REFERENCE TO RELATED APPLICATIONS

This application is a national stage application filed under 35 U.S.C. 371 of International Application No. PCT/JP2012/055023, filed Feb. 29, 2012, which claims priority from Japanese Patent Application No. 2011-100934, filed Apr 28, 2011, each of which is incorporated by reference herein in its entirety.

TECHNICAL FIELD

The present invention relates to a fuel cell vehicle. In particular, the present invention relates to a fuel cell vehicle equipped with a fuel cell stack including an intake duct and an exhaust duct.

BACKGROUND ART

Among fuel cell vehicles, there is a fuel cell vehicle equipped with a fuel cell system including: a pressure-type air supplying device which compresses air with a compressor and supplies the air to a fuel cell stack; and a water-cooled-type cooling device which cools the fuel cell stack with cooling water.

Such a fuel cell system has a large number of accessories, and therefore, the fuel cell system needs a large space for mounting the fuel cell system in the vehicle.

CITATION LIST

Patent Literature

PTL 1: Japanese Patent Application Laid-Open No. 2004-042828

A fuel-cell-equipped vehicle of PTL 1 corresponds to that equipped with the fuel cell system including the pressure-type air supplying device and the water-cooled-type cooling device, in a space behind a rear seat.

SUMMARY OF INVENTION

Technical Problem

PTL 1 described above has a problem that, due to a structure thereof, the space behind the rear seat is occupied by many accessories and a fuel cell stack, and as a result, a luggage compartment is reduced in size.

Among the fuel cell systems, there is an air-cooled fuel cell system which uses air as a reaction gas and a cooling medium. In such a fuel cell system, air drawn in by an air blowing fan is introduced into a fuel cell stack by using an intake duct, and the air is used to cool the fuel cell stack together with power generation. Thereafter, the air is discharged to the exterior from the fuel cell stack by using an exhaust duct.

Such an air-cooled fuel cell system has a small number of accessories, and the air-cooled fuel cell system can be mounted below a floor of a vehicle. However, the air-cooled fuel cell system has the following drawback. In a case in which the intake duct and the exhaust duct do not have optimal shapes, the air flow resistance increases, and a sufficient amount of air cannot be supplied to the fuel cell stack.

In view of the above, an object of the present invention is to provide a fuel cell vehicle which can supply a sufficient amount of air to a fuel cell stack when the fuel cell stack is mounted below a floor, the fuel cell stack being configured to draw in air through an intake duct and being configured to discharge air to the exterior through an exhaust duct.

Solution to Problem

The present invention relates to a fuel cell vehicle comprising: a fuel cell stack including an air introduction surface and an air discharge surface at positions opposite to each other, the fuel stack being arranged below a floor; an intake duct configured to draw in air, the intake duct being arranged on the air introduction surface side; and an exhaust duct configured to discharge air, the exhaust duct being arranged on the air discharge surface side; wherein the air introduction surface is arranged so as to face upward or downward in a vehicle upper and lower direction; wherein an intake passage portion of the intake duct is arranged along the air introduction surface and vertical walls of left and right end portions of the fuel cell stack, and a pair of air introduction ports opens in left and right end portions of the intake passage portion; and wherein an exhaust passage portion of the exhaust duct is arranged along the air discharge surface and vertical walls of front and rear end portions of the fuel cell stack, and a pair of air discharge ports opens in front and rear end portions of the exhaust passage portion.

Advantageous Effects of Invention

The fuel cell vehicle of the present invention can supply a sufficient amount of air to the fuel cell stack when the fuel cell stack is mounted below the floor.

DESCRIPTION OF EMBODIMENTS

The present invention optimizes the shapes of an intake duct and an exhaust duct in a fuel cell vehicle equipped with a fuel cell stack including the intake duct and the exhaust duct, and thereby solves the problems described above.

Embodiment

FIGS. 1 to 7 show an embodiment of the present invention.

Figure 1:
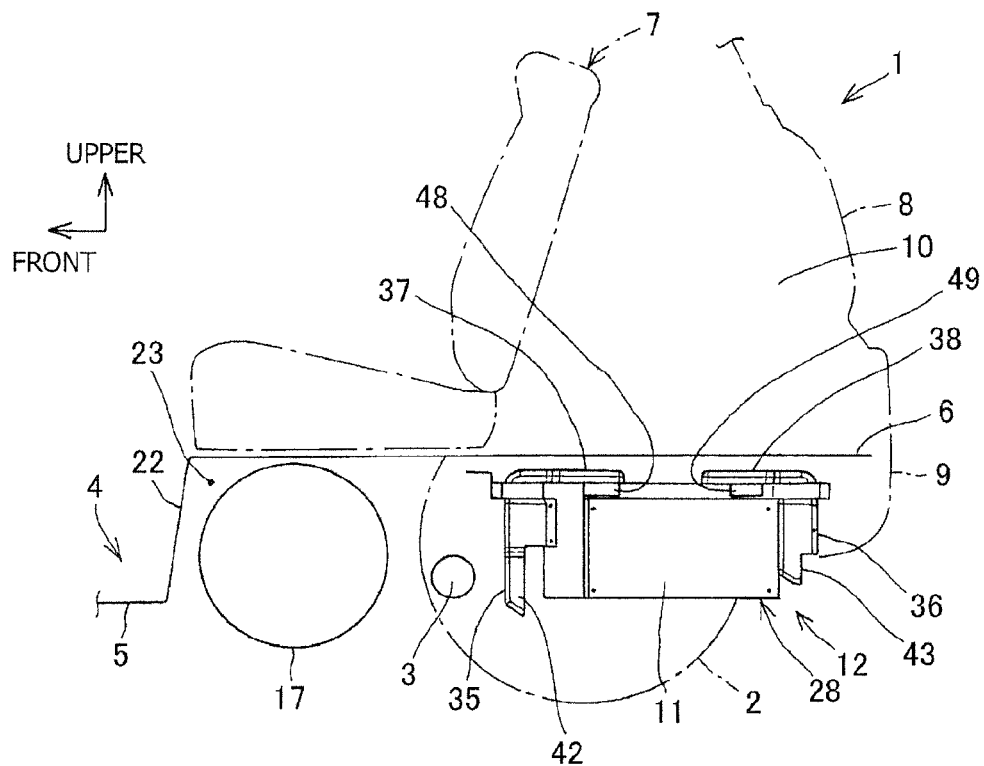
FIG. 1 is a side view of a vehicle rear portion. (Embodiment)

In FIG. 1, reference numeral "1" denotes a fuel cell vehicle (hereafter, referred to as "vehicle") which is a four-wheel vehicle, reference numeral "2" denotes a rear wheel, reference numeral "3" denotes a rear axle, reference numeral "4" denotes a floor, reference numeral "5" denotes a front floor, reference numeral "6" denotes a rear floor, reference numeral "7" denotes a rear seat, reference numeral "8" denotes a hatchback door, reference numeral "9" denotes a rear bumper, and reference numeral "10" denotes a luggage compartment.

A fuel cell system 12 including a fuel cell stack 11 is mounted on the vehicle 1.

Figure 2:
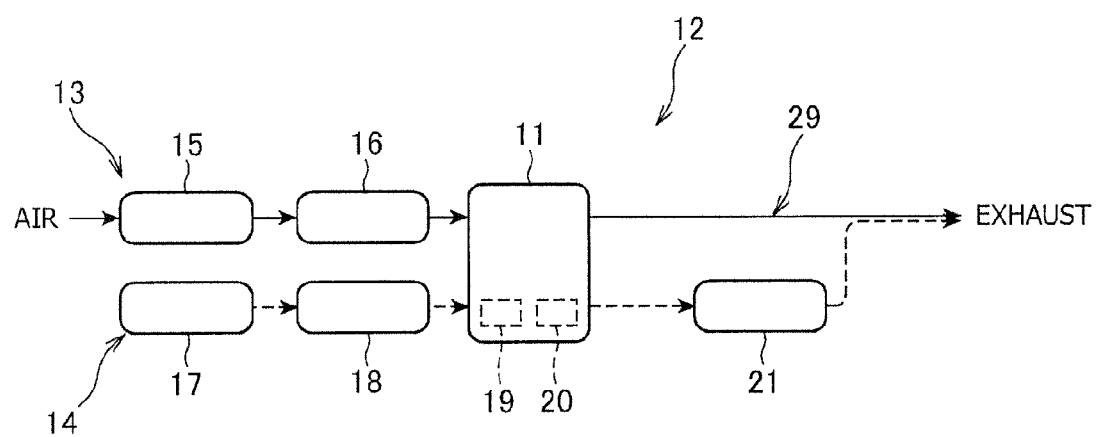
FIG. 2 is a block diagram of a fuel cell system. (Embodiment)

As shown in FIG. 2, the fuel cell system 12 includes: an air supplying device 13 configured to supply air; and a hydrogen supplying device 14 configured to supply hydrogen, on a supply side of the fuel cell stack 11.

The air supplying device 13 cleans air by using an air filter 15, and the air supplying device 13 supplies air which is drawn in from an intake duct 28 described below, to the fuel cell stack 11 by using an air which blows fan 16 to perform power generation and cooling of the fuel cell stack 11.

The hydrogen supplying device 14 decompresses a high-pressure compressed hydrogen gas stored in a hydrogen tank 17 by using a decompression valve 18, and the hydrogen supplying device 14 introduces the hydrogen gas into an anode intake portion 19 of the fuel cell stack 11.

After that, in the fuel cell system 12, air which has been used for power generation and cooling, is discharged to the exterior by using an exhaust duct 29 described below. In this case, an excess hydrogen gas discharged from an anode exhaust portion 20 of the fuel cell stack 11 is sent to the exhaust duct 29 via a purge valve 21, the excess hydrogen gas is diluted with air to a concentration which is not higher than the lower flammability limit, and then, the excess hydrogen gas is released to the exterior.

As shown in FIG. 1, in a rear portion of the vehicle 1, the floor 4 has a step shape in which the front floor 5 and the rear floor 6 are connected to each other via a floor vertical wall portion 22. Furthermore, the rear floor 6 is arranged above the front floor 5 and a space portion 23 is formed below the rear floor 6.

Regarding an area below the rear floor 6, a fuel cell stack 11 is arranged below the luggage compartment 10 in the space portion 23. Furthermore, the hydrogen tank 17 is arranged in front of the fuel cell stack 11, below the rear seat 7.

Figure 3:
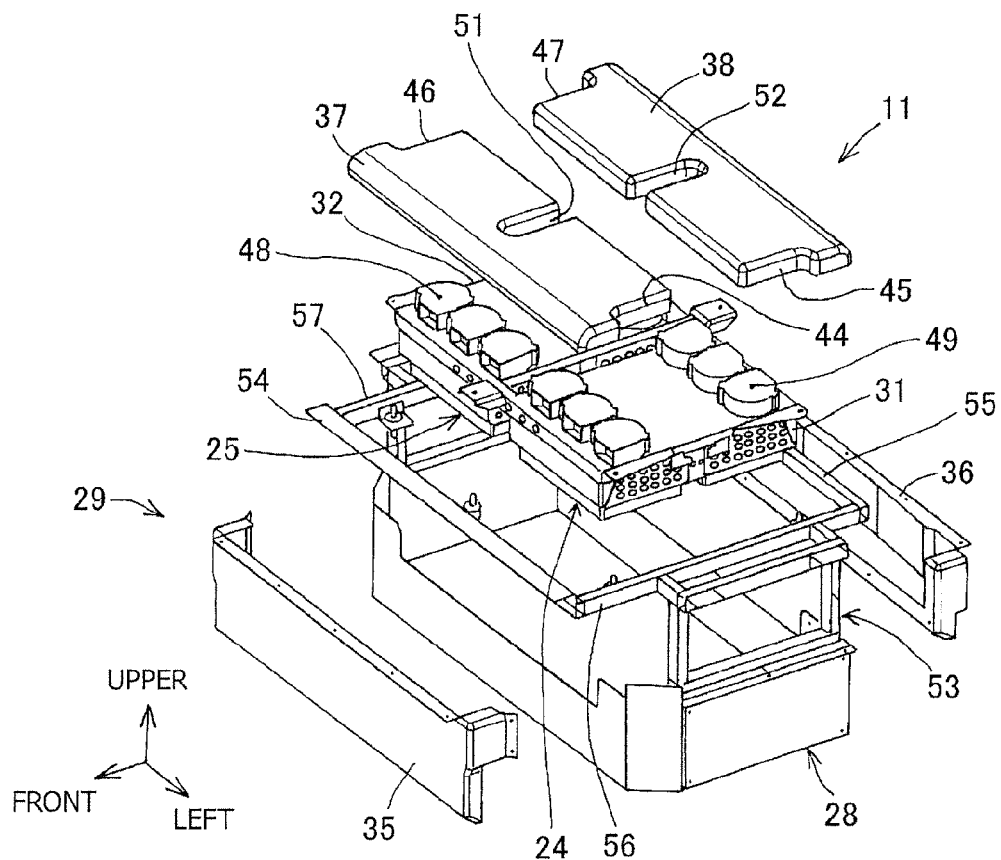
FIG. 3 is an exploded perspective view of an intake duct and an exhaust duct. (Embodiment)
Figure 7:
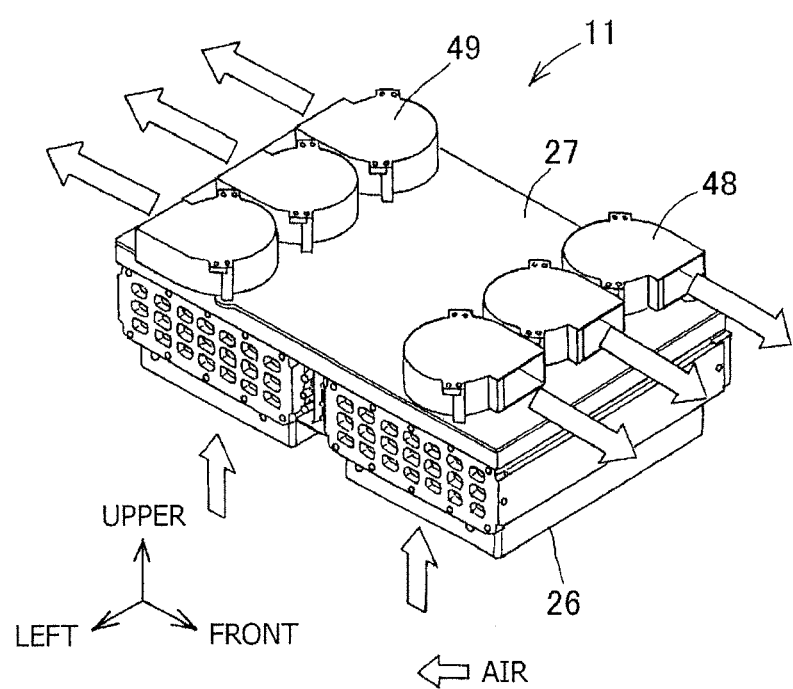
FIG. 7 is a perspective view of the fuel cell stack. (Embodiment)

As shown in FIGS. 3 and 7, the fuel cell stack 11 includes two fuel cells, such as a left fuel cell unit 24 and a right fuel cell unit 25, and the fuel cell stack 11 also includes an air introduction surface 26 and an air discharge surface 27 which face in opposite directions, respectively. The air introduction surface 26 is arranged so as to face upward or downward in a vehicle upper and lower direction.

Furthermore, as shown in FIGS. 3 to 6, in the fuel cell stack 11, the intake duct 28 configured to draw in air, is arranged on the air introduction surface 26 side, and the exhaust duct 29 configured to discharge air is arranged on the air discharge surface 27 side.

As shown in FIG. 3, the intake duct 28 is formed in a box shape which covers the left fuel cell unit 24 and the right fuel cell unit 25 from below.

Figure 4:
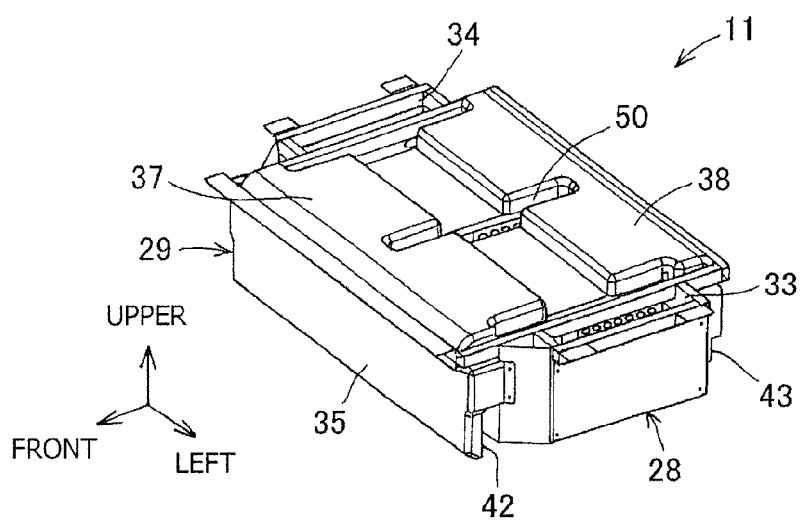
FIG. 4 is a perspective view of a fuel cell stack to which the intake duct and the exhaust duct are attached. (Embodiment)
Figure 5:
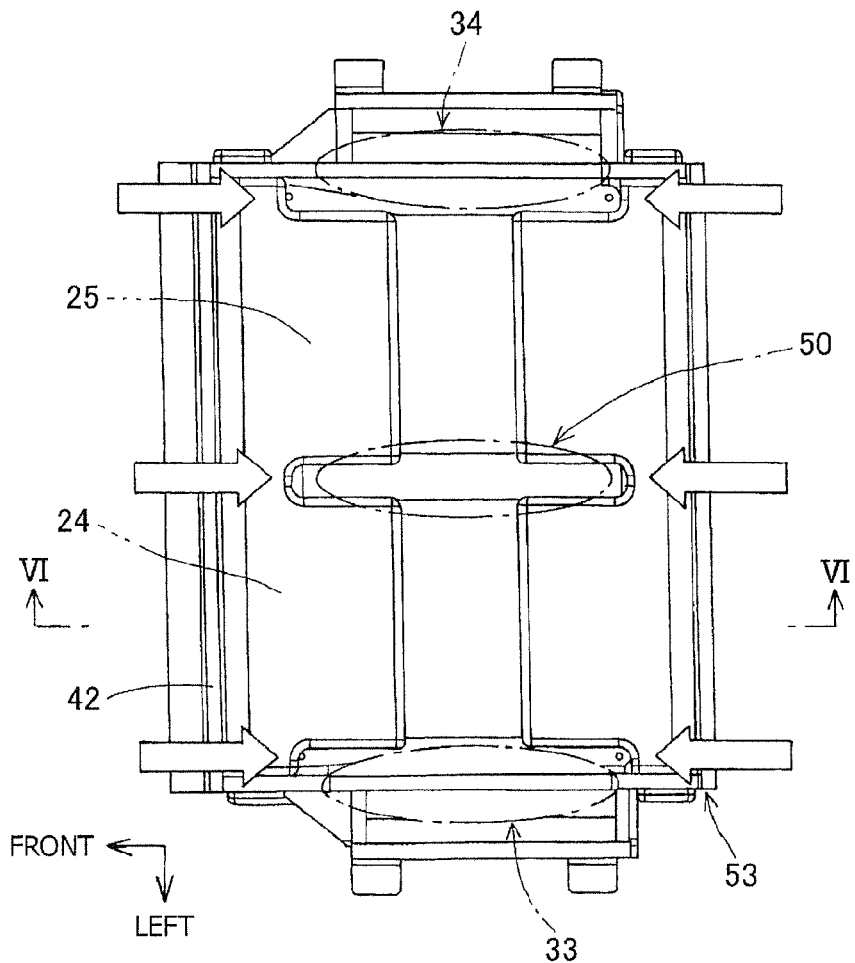
FIG. 5 is a plan view of the fuel cell stack. (Embodiment)

An intake-side passage portion 30 of the intake duct 28 is arranged along the air introduction surface 26 as well as a left vertical wall 31 and a right vertical wall 32, and the left vertical wall 31 and the right vertical wall 32 correspond to vertical walls in left and right end portions of the fuel cell stack 11. As shown in FIGS. 4 and 5, a left air introduction port 33 and a right air introduction port 34 serve as a pair of air introduction ports, and the left air introduction port 33 and the right air introduction port 34 open in left and right end portions of the intake-side passage portion 30.

As shown in FIG. 3, the exhaust duct 29 is configured of a front exhaust duct 35, a rear exhaust duct 36, an upper side front exhaust duct 37, and an upper side rear exhaust duct 38.

Figure 6:
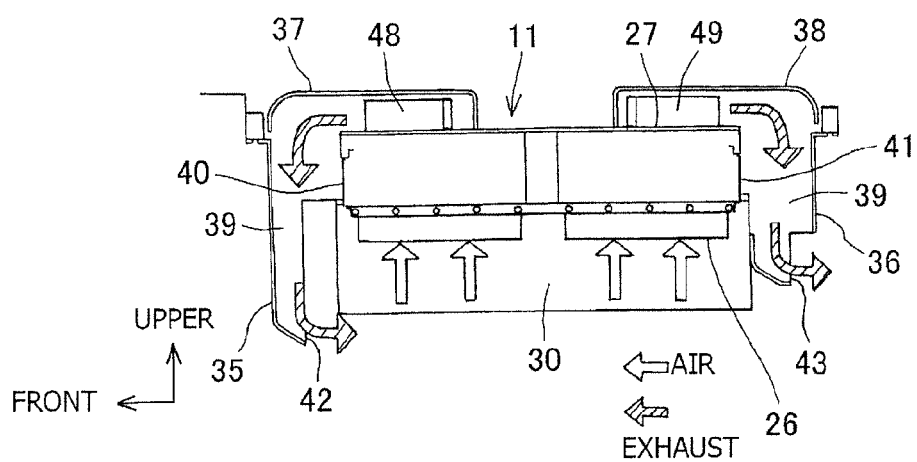
FIG. 6 is a cross-sectional view of the fuel cell stack taken along the VI-VI line of FIG. 5. (Embodiment)

As shown in FIG. 6, an exhaust-side passage portion 39 of the exhaust duct 29 is arranged so as to extend along the air discharge surface 27 as well as a front vertical wall 40 and a rear vertical wall 41 of front and rear end portions of the fuel cell stack 11. As shown in FIG. 4, a front air discharge port 42 and a rear air discharge port 43 serve as a pair of air discharge ports, and the front air discharge port 42 and the rear air discharge port 43 open in front and rear end portions of the exhaust-side passage portion 39.

As shown in FIGS. 3 to 5, the left air introduction port 33 is adjacent to an upper side left and front recessed portion 44 and an upper side left and rear recessed portion 45, and the upper side left and front recessed portion 44 and the upper side left and rear recessed portion 45 are formed in left ends of the upper side front exhaust duct 37 and the upper side rear exhaust duct 38. The right air introduction port 34 is adjacent to an upper side right and front recessed portion 46 and an upper side right and rear recessed portion 47, and the upper side right and front recessed portion 46 and the upper side right and rear recessed portion 47 are formed in right ends of the upper side front exhaust duct 37 and the upper side rear exhaust duct 38.

Furthermore, as shown in FIG. 5, the front air discharge port 42 opens at a position which is in front of the intake duct 28 and is lower than a bottom surface of the intake duct 28. The rear air discharge port 43 opens at a position which is behind the intake duct 28 and is higher than the bottom surface of the intake duct 28.

In such a structure, since the air intake surface 26 faces upward or downward in the vehicle upper and lower direction, it possible to increase the sizes of the air introduction surface 26 and the air discharge surface 27 in a vehicle front and rear direction and a vehicle left and right direction, and as a result, a large amount of air into the fuel cell stack 11 is introduced.

Furthermore, since the air introduction ports 33, 34 of the intake duct 28 open in the left and right portions of the fuel cell stack 11, it possible to increase the opening areas of the air introduction ports 33, 34, and as a result, a sufficient amount of air to the fuel cell stack 11 is supplied. In addition, even when the air introduction surface 26 has a shape elongated in the vehicle left and right direction, air can be evenly supplied to the overall air introduction surface 26 of the fuel cell stack 11.

In addition, since the air discharge ports 42, 43 of the exhaust duct 29 open on the front and rear sides of the fuel cell stack 11, the opening areas of the air discharge ports 42, 43 can be increased. It is possible to reduce the passage length of the exhaust duct 29, and as a result, the air flow resistance is reduced.

Accordingly, even when the fuel cell stack 11 is arranged below the floor 4, it is possible to reduce the air flow resistance of the intake duct 28 and the exhaust duct 29, and it is possible to supply a sufficient amount of air to the fuel cell stack 11.

Furthermore, the fuel cell system 12 has such a structure that the intake passage portion 30 of the intake duct 28 extends along the left vertical wall 31 and the right vertical wall 32 of the fuel cell stack 11, and the exhaust passage portion 39 of the exhaust duct 29 extend along the front vertical wall 40 and the rear vertical wall 41 of the fuel cell stack 11, and therefore, the intake duct 28 and the exhaust duct 29 can be mounted integrally with the fuel cell stack 11, below the rear floor 6 of the vehicle 1.

As shown in FIG. 7, the air introduction surface 26 is arranged so as to face downward in a vehicle upper and lower direction.

Due to this structure, the left air introduction port 33 and the right air introduction port 34 of the intake duct 28 are opened at positions which are close to the rear floor 6 and is away from the ground. Accordingly, intrusion of water and dust into the intake duct 28 can be prevented.

As shown in FIG. 3, the fuel cell stack 11 has such a structure that the two fuel cell units, such as the left fuel cell unit 24 and the right fuel cell unit 25, and the left fuel cell unit 24 and the right fuel cell unit 25 serve as a plurality of fuel cell units, and the left fuel cell unit 24 and the right fuel cell unit 25 are arranged in the vehicle left and right direction at a predetermined interval therebetween. A plurality of front air suction fans 48 and a plurality of rear air suction fans 49 are arranged in a predetermined manner on the air discharge surface 27 of the left fuel cell unit 24 and the right fuel cell unit 25. The front air suction fans 48 are covered with the upper side front exhaust duct 37 from above. The rear air suction fans 49 are covered with the upper side rear exhaust duct 38 from above.

Furthermore, the intake duct 28 includes a center air introduction port 50, and the center air introduction port 50 serves as another air introduction port, between the left fuel cell unit 24 and the right fuel cell unit 25. As shown in FIG. 3, the center air introduction port 50 is configured of an upper side center and front recessed portion 51 and an upper side center and rear recessed portion 52 which are formed in center portions of the upper side front exhaust duct 37 and the upper side rear exhaust duct 38 respectively.

Due to this structure, the number of the air introduction ports can be increased along with an increase in the number of the fuel cell units. Therefore, a sufficient amount of air can be supplied to the fuel cell stack 11.

As shown in FIG. 1, the fuel cell stack 11 is arranged in front of the rear bumper 9. Furthermore, one of the air exhaust ports of the exhaust duct 29, the rear air discharge port 43 arranged in front of the rear bumper 9 is open below a lower end of the rear bumper 9 in the vehicle upper and lower direction.

This structure can prevent the excess hydrogen gas discharged to the exterior of the vehicle from the rear air discharge port 43 of the exhaust duct 29 from accumulating in the rear bumper 9.

As shown in FIGS. 3 and 4, the overall outer surface of the fuel cell stack 11 is covered with the intake duct 28 and the exhaust duct 29.

In this structure, the intake duct 28 and the exhaust duct 29 can protect the fuel cell stack 11 from mud and flying stones.

As shown in FIGS. 3 and 6, the fuel cell stack 11 is mounted on a rim-shaped frame 53 which surrounds the front and rear, left, and right sides of the fuel cell stack 11. The frame 53 includes a front frame portion 54, a rear frame portion 55, a left frame portion 56, and a right frame portion 57 so as to be formed in a square shape.

Furthermore, the intake duct 28 and the exhaust duct 29 are attached to an outer portion of the frame 53.

Such a structure makes it possible to mount the intake duct 28 and the exhaust duct 29 integrally with the fuel cell stack 11 on the vehicle, regardless of the shape of the fuel cell stack 11. Therefore, the mountability of these components onto the vehicle 1 can be improved.

In the present invention, the shapes respectively of the intake duct, the exhaust duct, the air introduction ports, and the air discharge ports can be changed as appropriate.

INDUSTRIAL APPLICABILITY

The structure of the intake duct and the exhaust duct of the present invention can be applied to various types of vehicles.

REFERENCE SIGNS LIST

1 Vehicle
4 Floor
6 Rear floor
11 Fuel cell stack
12 Fuel cell system
13 Air supplying device
14 Hydrogen supplying device
24 Left fuel cell unit
25 Right fuel cell unit
26 Air introduction surface
27 Air discharge surface
28 Intake duct
29 Exhaust duct
30 Intake-side passage portion
31 Left vertical wall
32 Right vertical wall
33 Left air introduction port
34 Right air introduction port
39 Exhaust-side passage portion
40 Front vertical wall
41 Rear vertical wall
42 Front air discharge port
43 Rear air discharge port
50 Center air introduction port
53 Frame

The invention claimed is:
1. A fuel cell vehicle comprising:
a fuel cell stack including an air introduction surface and an air discharge surface at positions opposite to each other, the fuel cell stack being arranged below a floor;
an intake duct configured to draw in air, the intake duct being arranged on the air introduction surface side; and
an exhaust duct configured to discharge air, the exhaust duct being arranged on the air discharge surface side;
wherein the air introduction surface is arranged so as to face upward or downward in a vehicle upper and lower direction;
wherein an intake passage portion of the intake duct is arranged along the air introduction surface and vertical walls of left and right end portions of the fuel cell stack, and left and right air introduction ports opens in left and right end portions of the intake passage portion respectively;
wherein an exhaust passage portion of the exhaust duct is arranged along the air discharge surface and vertical walls of front and rear end portions of the fuel cell stack, and front and rear air discharge ports opens in front and rear end portions of the exhaust passage portion respectively;
wherein the left and right air introduction ports are positioned on air discharge surface side regions of the left and right end portions of the intake passage portion respectively; and wherein the front and rear air discharge ports are positioned on air introduction surface side regions of the front and rear end portions of the exhaust passage portion respectively.

2. The fuel cell vehicle according to claim 1, wherein the air introduction surface is arranged so as to face downward in the vehicle upper and lower direction.

3. The fuel cell vehicle according to claim 1, wherein the fuel cell stack has such a structure that a plurality of fuel cell units are arranged in a vehicle left and right direction so as to be apart from one another at a predetermined interval, and
the intake duct includes another air introduction port between the fuel cell units.

4. The fuel cell vehicle according to claim 1, wherein the fuel cell stack is arranged in front of a rear bumper of the vehicle, and
one of the air discharge ports of the exhaust duct is arranged in front of the rear bumper, and the one of the air discharge ports is opened below a lower end of the rear bumper in the vehicle upper and lower direction.

5. The fuel cell vehicle according to claim 1, wherein entire outer surfaces of the fuel cell stack are covered with the intake duct and the exhaust duct.

6. The fuel cell vehicle according to claim 1, wherein the fuel cell stack is mounted on a rim-shaped frame which surrounds front and rear, left, and right side portions of the fuel cell stack, and
the intake duct and the exhaust duct are attached to an outer portion of the frame.

\* \* \* \* \*